(12) United States Patent
Kawase et al.

(10) Patent No.: US 12,011,979 B2
(45) Date of Patent: Jun. 18, 2024

(54) CATCHER STRUCTURE OF DOOR BEAM

(71) Applicant: Honda Motor Co., Ltd., Tokyo (JP)

(72) Inventors: Takahiro Kawase, Tokyo (JP);
Takafumi Raitoku, Tokyo (JP); Itaru Genpei, Tokyo (JP); Yasuhiro Imamura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/167,079

(22) Filed: Feb. 10, 2023

(65) Prior Publication Data

US 2023/0302881 A1    Sep. 28, 2023

(30) Foreign Application Priority Data

Mar. 23, 2022   (JP) ................................. 2022-047661

(51) Int. Cl.
*B60J 5/04*   (2006.01)

(52) U.S. Cl.
CPC ........... *B60J 5/0429* (2013.01); *B60J 5/0413* (2013.01); *B60J 5/0458* (2013.01)

(58) Field of Classification Search
CPC ....... B60J 5/0458; B60J 5/0429; B60J 5/0437
See application file for complete search history.

(56) References Cited

U.S. PATENT DOCUMENTS

| | | | | |
|---|---|---|---|---|
| 5,137,325 A * | 8/1992 | Ohya | ..................... | B60J 5/0429 49/502 |
| 5,544,930 A * | 8/1996 | Stedman | ................ | B60J 5/0437 403/282 |
| 5,992,922 A * | 11/1999 | Harbig | ................... | B60J 5/0444 296/146.6 |
| 6,398,289 B1 * | 6/2002 | Gehringhoff | .......... | B60J 5/0437 296/202 |
| 10,549,610 B2 * | 2/2020 | Tanaka | .................... | B60J 5/0437 |
| 10,787,064 B2 * | 9/2020 | Benson | .................. | B62D 25/02 |
| 10,836,437 B2 * | 11/2020 | Murray | ................ | B62D 25/087 |
| 10,882,561 B2 * | 1/2021 | Nakashima | ........... | B62D 25/04 |
| 11,091,012 B2 * | 8/2021 | Williams | ............... | B60J 5/0425 |
| 2014/0375078 A1 * | 12/2014 | Fujihara | ................ | B60J 5/0437 296/146.6 |

FOREIGN PATENT DOCUMENTS

JP             6832762          2/2021

* cited by examiner

*Primary Examiner* — Janet M Wilkens
*Assistant Examiner* — Susan M. Heschel
(74) *Attorney, Agent, or Firm* — JCIPRNET

(57) ABSTRACT

A catcher structure of a door beam is provided. A catcher mechanism is composed of an engaging hook connected to a rear end part of a door beam, and an insertion hole provided at a lower end part of a center pillar, which is a member on a vehicle body side. In a state in which a door is closed, the rear end part of the door beam, and the engaging hook and the insertion hole of the catcher mechanism are arranged at positions overlapping with each other when viewed from a vehicle width direction. The engaging hook includes a projection part projecting from the rear end part of the door beam toward an inner side in the vehicle width direction, and the insertion hole opens toward an outer side in the vehicle width direction.

9 Claims, 5 Drawing Sheets

CATCHER STRUCTURE OF DOOR BEAM

CROSS-REFERENCE TO RELATED APPLICATION

This application claims the priority benefit of Japan application serial no. 2022-047661, filed on Mar. 23, 2022. The entirety of the above-mentioned patent application is hereby incorporated by reference herein and made a part of this specification.

BACKGROUND

Technical Field

The disclosure relates to a catcher structure of a door beam that connects an end part of a door beam provided in a vehicle door to a vehicle body side.

Related Art

As a catcher structure of a door beam that connects an end part of a door beam provided in a vehicle door to a vehicle body side, Patent Document 1 (Japanese Patent No. 6832762) has disclosed a structure in which a rear end part of a door beam (rear door lower beam) installed inside a rear door is engaged with a rear quarter part (vehicle body side) via a catcher mechanism (rear door catcher mechanism) provided at a lower part of a C pillar (rear pillar). As shown in FIG. 3 of Patent Document 1, this catcher mechanism is composed of a fitting member that projects from a rear end part of a metal plate material that constitutes the rear door toward the vehicle rear side, and a receiving member provided at the lower part of the C pillar.

According to the catcher mechanism described in Patent Document 1, for example, if the door beam is pushed toward the inner side (vehicle interior side) in the vehicle width direction by a load applied to the rear door due to a collision (side collision) from the side of the vehicle, a tensile force acts on the catcher mechanism in the vehicle front-rear direction. In that case, the engaging part of the catcher mechanism is engaged with a fitting groove, thereby restricting their relative movement. Accordingly, the movement of the door beam in the vehicle front-rear direction is restricted.

However, in the conventional structure described in Patent Document 1, since the fitting member (hook) of the catcher mechanism extends from the rear end part of the rear door toward the rear side, when a middle part of the door beam in the longitudinal direction is pushed toward the vehicle interior side due to a side collision load, there is a risk that the fitting member would move in a direction rotating outward around the rear end part of the rear door, and as a result, the fitting between the fitting member and the receiving member would be disengaged.

SUMMARY

A catcher structure of a door beam according to an embodiment of the disclosure includes a door (14A) and a catcher mechanism (50). The door (14A) is attached to a vehicle body (10) in an openable and closable manner. The catcher mechanism (50) serves for connecting the door (14A) and a member (17a) on a vehicle body side in a state in which the door (14A) is closed. The door (14A) includes an inner panel (20) and an outer panel (22) provided respectively on an inner side and an outer side in a vehicle width direction; and a door beam (40) in an elongated shape which is arranged between the inner panel (20) and the outer panel in the vehicle width direction and extends in a front-rear direction of the vehicle body. The catcher mechanism (50) is composed of: an engaging member (60) connected to an end part (40b) of the door beam (40); and an engaged part (7) which is provided at the member (17a) on the vehicle body side and engages the engaging member (60). In the state in which the door (14A) is closed, the end part (40b) of the door beam (40), and the engaging member (60) and the engaged part (7) of the catcher mechanism (50) are arranged at positions overlapping with each other when viewed from the vehicle width direction.

The above symbols in parentheses indicate, for reference, the drawing reference signs of corresponding constituent elements in the embodiment to be described later.

According to the catcher structure of a door beam according to the embodiment of the disclosure, it is possible to effectively prevent, with a simple structure, disengagement of the catcher structure in the event of a vehicle side collision, and suppress a decrease in smoothness of traffic of vehicles while improving the safety of traffic.

DESCRIPTION OF THE EMBODIMENTS

Figure 1:
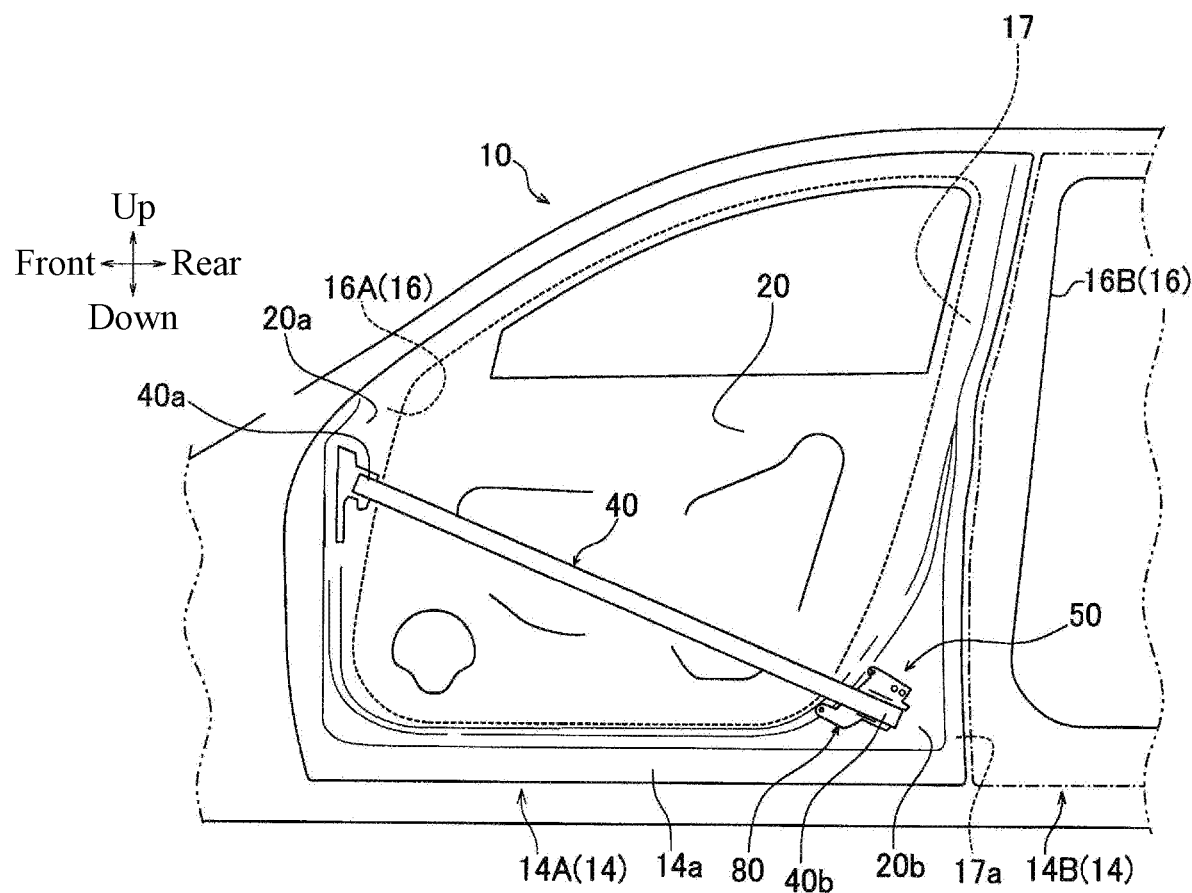
FIG. 1 is a view showing a part of a side surface of a vehicle body to which a catcher structure of a door beam according to an embodiment of the disclosure is applied.

An embodiment of the disclosure provides a catcher structure of a door beam capable of effectively preventing, with a simple structure, disengagement of the catcher structure in the event of a vehicle side collision, and capable of suppressing a decrease in smoothness of traffic of vehicles while improving the safety of traffic.

A catcher structure of a door beam according to an embodiment of the disclosure includes a door (14A) and a catcher mechanism (50). The door (14A) is attached to a vehicle body (10) in an openable and closable manner. The catcher mechanism (50) serves for connecting the door (14A) and a member (17a) on a vehicle body side in a state in which the door (14A) is closed. The door (14A) includes an inner panel (20) and an outer panel (22) provided respectively on an inner side and an outer side in a vehicle width direction; and a door beam (40) in an elongated shape which is arranged between the inner panel (20) and the outer panel in the vehicle width direction and extends in a front-rear direction of the vehicle body. The catcher mechanism (50) is composed of: an engaging member (60) connected to an end part (40b) of the door beam (40); and an engaged part (7) which is provided at the member (17a) on the vehicle body side and engages the engaging member (60). In the state in which the door (14A) is closed, the end part (40b) of the door beam (40), and the engaging member (60) and the engaged part (7) of the catcher mechanism (50) are arranged at positions overlapping with each other when viewed from the vehicle width direction.

Further, in this catcher structure, the engaging member (60) may include a projection part (62) projecting from the end part (40b) of the door beam (40) toward the inner side in the vehicle width direction, and the engaged part (7) may have an insertion hole (7) which opens toward the outer side in the vehicle width direction and into which the projection part (62) is inserted.

According to the catcher structure of a door beam according to the embodiment of the disclosure, when a load due to a collision (side collision) from the side of the vehicle is applied to the door beam, since the engaging member is displaced in a direction of being pushed into the engaged part by the door beam displaced toward the inner side (vehicle interior side) in the vehicle width direction due to the load, it is possible to reduce the possibility that the projection part of the engaging member would slip out of the insertion hole of the engaged part. Accordingly, with a simple configuration, it is possible to effectively prevent disengagement of the catcher mechanism structure in the event of a side collision of the vehicle. Therefore, since the tensile force in the longitudinal direction can be more reliably applied to the door beam, it is possible to effectively suppress the bending of the door beam toward the inner side (vehicle interior side) in the vehicle width direction due to the load of a side collision.

Further, in this catcher structure, the projection part (62) of the engaging member (60) may be in an elongated shape with its longitudinal direction (L1) extending in a direction intersecting a longitudinal direction (L2) of the door beam (40).

According to this configuration, in the case where the central portion in the longitudinal direction of the door beam is deformed by the load due to a side collision of the vehicle and is pushed further toward the vehicle interior side than the two end parts, and thus the engaging member is displaced toward the center in the longitudinal direction of the door beam, with the projection part of the engaging member coming into planar contact (so-called plane-to-plane contact) with the inner surface of the insertion hole on the door beam side, it is possible to more effectively prevent the projection part from slipping out of the insertion hole. That is, with the projection part of the engaging member being in an elongated shape with its longitudinal direction extending in a direction intersecting the longitudinal direction of the door beam, since the side surface of the projection part in the longitudinal direction is in planar contact with the inner surface of the insertion hole, the contact resistance (frictional resistance) of the contact portion between the projection part and the insertion hole can be improved. Further, since it is possible to effectively disperse and receive the load applied to the contact portion between the projection part and the insertion hole, disengagement of the catcher mechanism can be more effectively prevented even with a large load.

Further, this catcher structure may include a bracket (80) which attaches the end part (40b) of the door beam (40) to the inner panel (20), and the engaging member (60) may be fixed to the bracket (80).

According to this configuration, since the engaging member is fixed to the end part of the door beam via the bracket, relative displacement between the door beam and the engaging member can be prevented. Therefore, since the tensile force in the longitudinal direction can be more reliably applied to the door beam, it is possible to more effectively prevent the central part in the longitudinal direction of the door beam from displacing (deforming) toward the inner side (vehicle interior side) in the vehicle width direction.

Further, according to this configuration, by fixing the engaging member to the end part of the door beam via the bracket formed of a plate-shaped member which is relatively easy to process, compared to the case where the engaging member is directly fixed to the end part of the door beam, it is possible to facilitate the manufacturing process of the vehicle (vehicle body), improve the manufacturing efficiency, and reduce the costs.

Further, in this catcher structure, the bracket (80) may include a pair of extending parts (82, 82) extending in a longitudinal direction of the door beam (40) on two sides (upper side and lower side in the embodiment to be described later) in a direction intersecting the longitudinal direction with respect to the end part (40b) of the door beam (40), and the engaging member (60) may be fixed to the pair of extending parts (82, 82) of the bracket (80).

According to this configuration, by fixing the engaging member to the extending parts of the bracket respectively provided on two sides (upper side and lower side) across the end part of the door beam, it is possible to prevent the engaging member from moving in a direction falling to two sides (upper side and lower side) in a direction intersecting the longitudinal direction with respect to the door beam in the event of a side collision of the vehicle.

Further, in this catcher structure, the engaging member (60) may be composed of a first member (60A) and a second member (60B). The first member (60A) is formed of a plate-shaped member having a substantially L-shaped cross section including a first attachment part (61a) attached to the door (14A) and a first projection part (62a) extending from the first attachment part (61a) toward the inner side in the vehicle width direction. The second member (60B) is formed of a plate-shaped member having a substantially L-shaped cross section including a second attachment part (61b) attached to the door (14A) and a second projection part (62b) extending from the second attachment part (61b) toward the inner side in the vehicle width direction. The first projection part (62a) of the first member (60A) and the second projection part (62b) of the second member (60B) may be overlapped with each other. The first attachment part (61a) of the first member (60A) and the second attachment part (61b) of the second member (60B) extend in directions different from each other.

According to this configuration, since the first member and the second member which constitute the engaging member can be formed by bending, the productivity of the vehicle body is improved. Further, with the first projection part and the second projection part overlapping with each other and the first attachment part and the second attachment part extending in directions different from each other, since it is possible to prevent collapse of the first projection part and the second projection part (displacement of the first member and the second member in a direction in which the first projection part and the second projection part are inclined), disengagement of the projection part of the engaging member and the insertion hole can be more reliably prevented.

The above symbols in parentheses indicate, for reference, the drawing reference signs of corresponding constituent elements in the embodiment to be described later.

According to the catcher structure of a door beam according to the embodiment of the disclosure, it is possible to effectively prevent, with a simple structure, disengagement of the catcher structure in the event of a vehicle side collision, and suppress a decrease in smoothness of traffic of vehicles while improving the safety of traffic.

Hereinafter, an embodiment of the disclosure will be described in detail with reference to the accompanying drawings. In the following description, the term "front" or "rear" refers to the front side, i.e., the forward direction, or the rear side, i.e., the backward direction, of a vehicle body (vehicle) (to be described later). Further, "left" and "right" respectively refer to left and right in the vehicle width direction when facing the forward direction (front side) of the vehicle body (vehicle). Further, the terms "up" and "down" refer to the up-down direction (vertical up-down direction) of the vehicle body (vehicle).

FIG. 1 is a view showing a part of a side surface of a vehicle body to which a catcher structure of a door beam according to an embodiment of the disclosure is applied. As shown in FIG. 1, a vehicle including the catcher structure of a door beam according to the embodiment of the disclosure is configured to include a side door 14 provided on a vehicle body 10. The side door 14 is composed of a front door 14A and a rear door 14B. Further, the vehicle body 10 is provided with a door opening 16 to which the side door 14 is attached in an openable and closable manner. The door opening 16 includes a front door opening 16A and a rear door opening 16B. In the following description, of the side door 14 and the door opening 16, only the front door 14A and the front door opening 16A will be described, and descriptions of the rear door 14B and the rear door opening 16B will be omitted.

The front door 14A is formed of a door body 14a that opens and closes the front door opening 16A. The door body 14a of the front door 14A includes an inner panel 20 provided on the inner side in the vehicle width direction, an outer panel (not shown) provided on the outer side of the inner panel 20 in the vehicle width direction, and a door beam 40 provided between the inner panel 20 and the outer panel in the vehicle width direction. The inner panel 20 and the outer panel are plate-shaped members made of metal, and the door beam 40 is an elongated (rod-shaped) member made of metal.

The door beam 40 is arranged inside the door body 14a of the front door 14A, and is a cylindrical member having a hollow circular cross section that extends along the front-rear direction (specifically, in an oblique front-rear direction that slopes downward from the front side toward the rear side) of the vehicle body 10.

A front end part 40a of the door beam 40 is fixed to an upper part 20a of the front side of the inner panel 20. Further, a rear end part 40b of the door beam 40 is fixed to a lower part 20b of the rear side of the inner panel 20. That is, the door beam 40 obliquely extends from the upper part of the front side (near the upper-front side corner) of the front door 14A toward the lower part of the rear side (near the lower-rear side corner).

Figure 2:
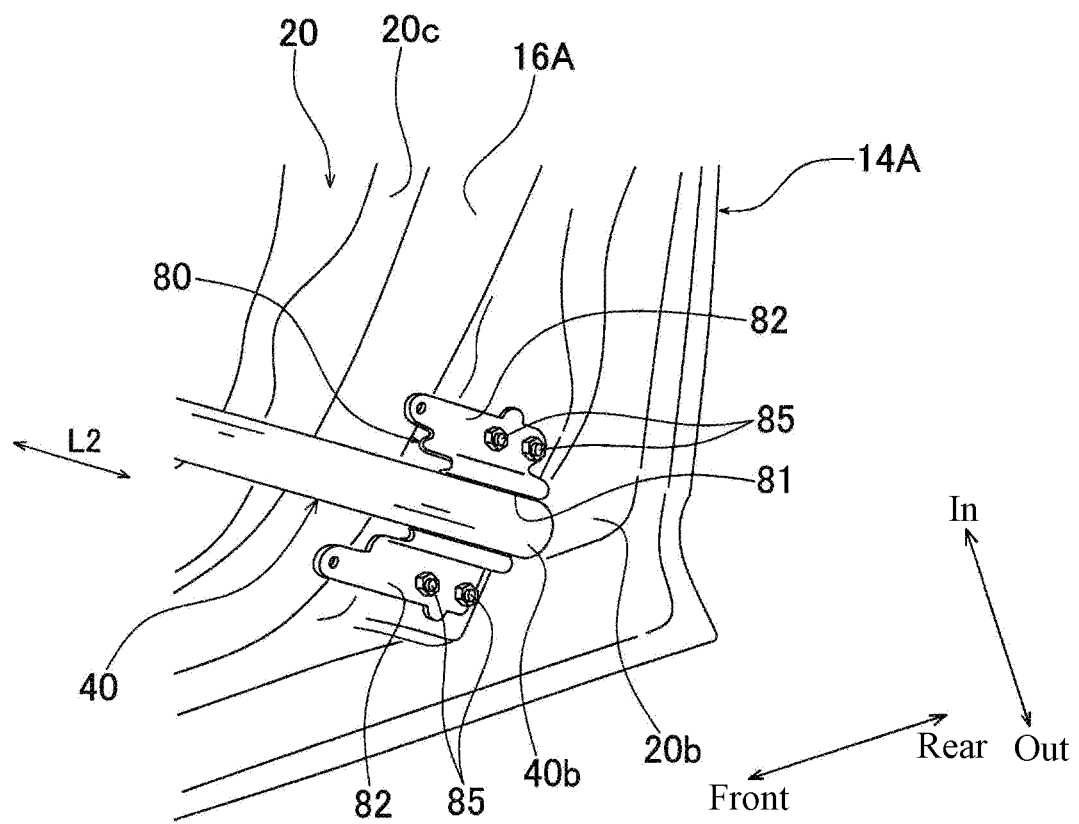
FIG. 2 is a view of a rear lower end part of a front door as viewed from the surface side, showing a rear end part of a door beam and its vicinity.
Figure 3:
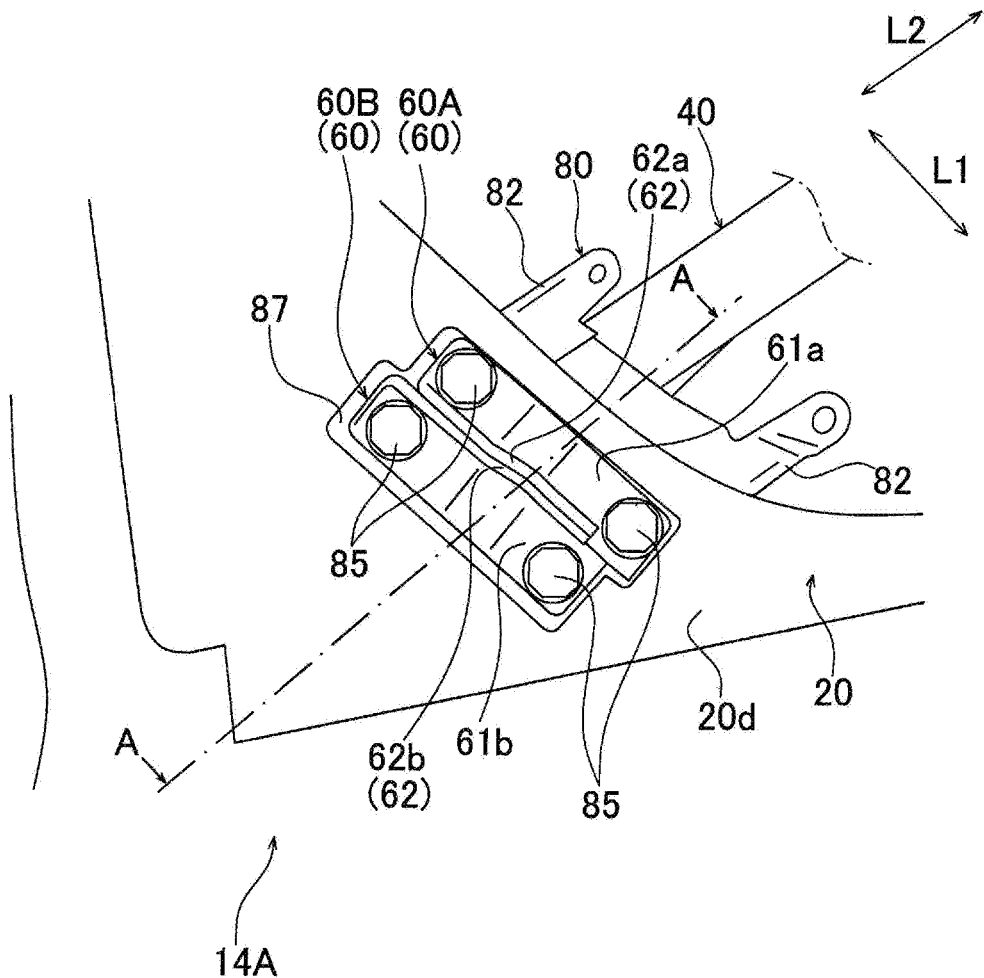
FIG. 3 is a view of a rear lower end part of the front door as viewed from the back side, showing an engaging member of a catcher mechanism.
Figure 4:
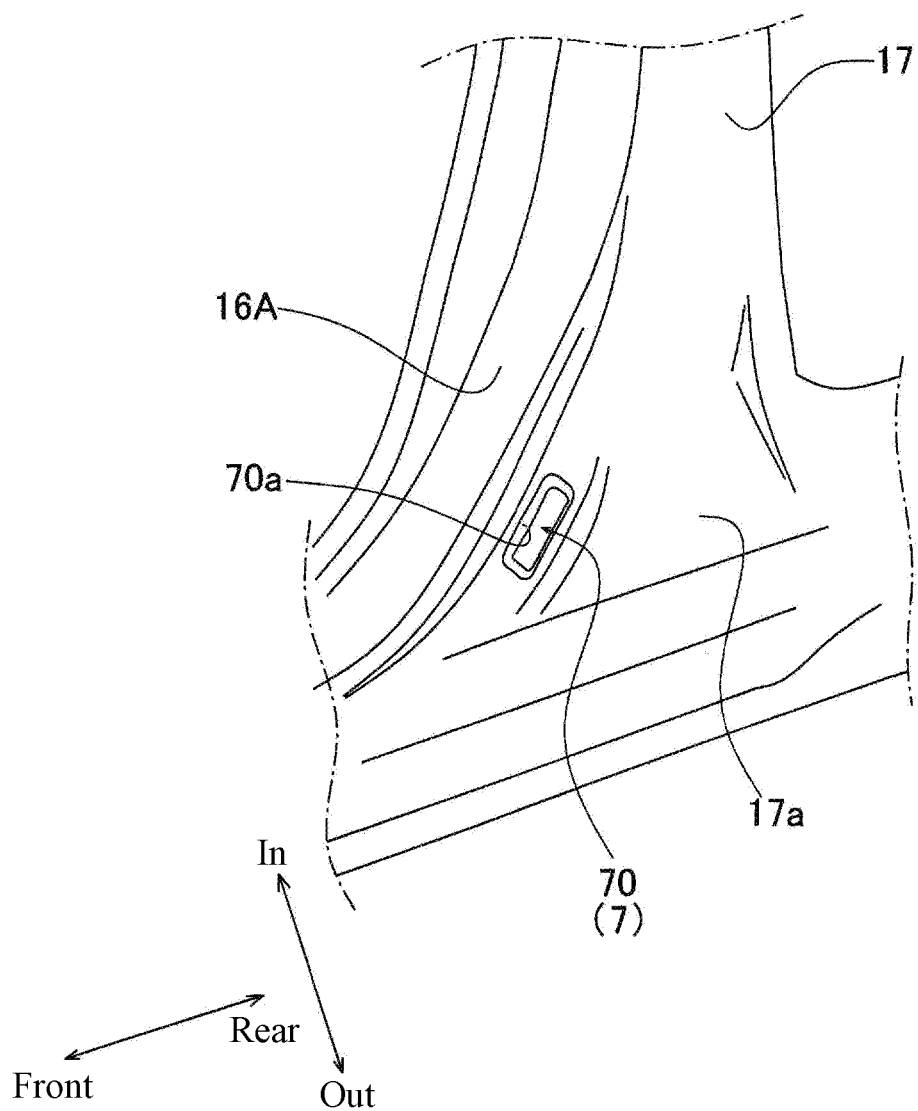
FIG. 4 is a view of a rear lower end part of a front door opening, showing an insertion hole of the catcher mechanism provided on the vehicle body side.
Figure 5:
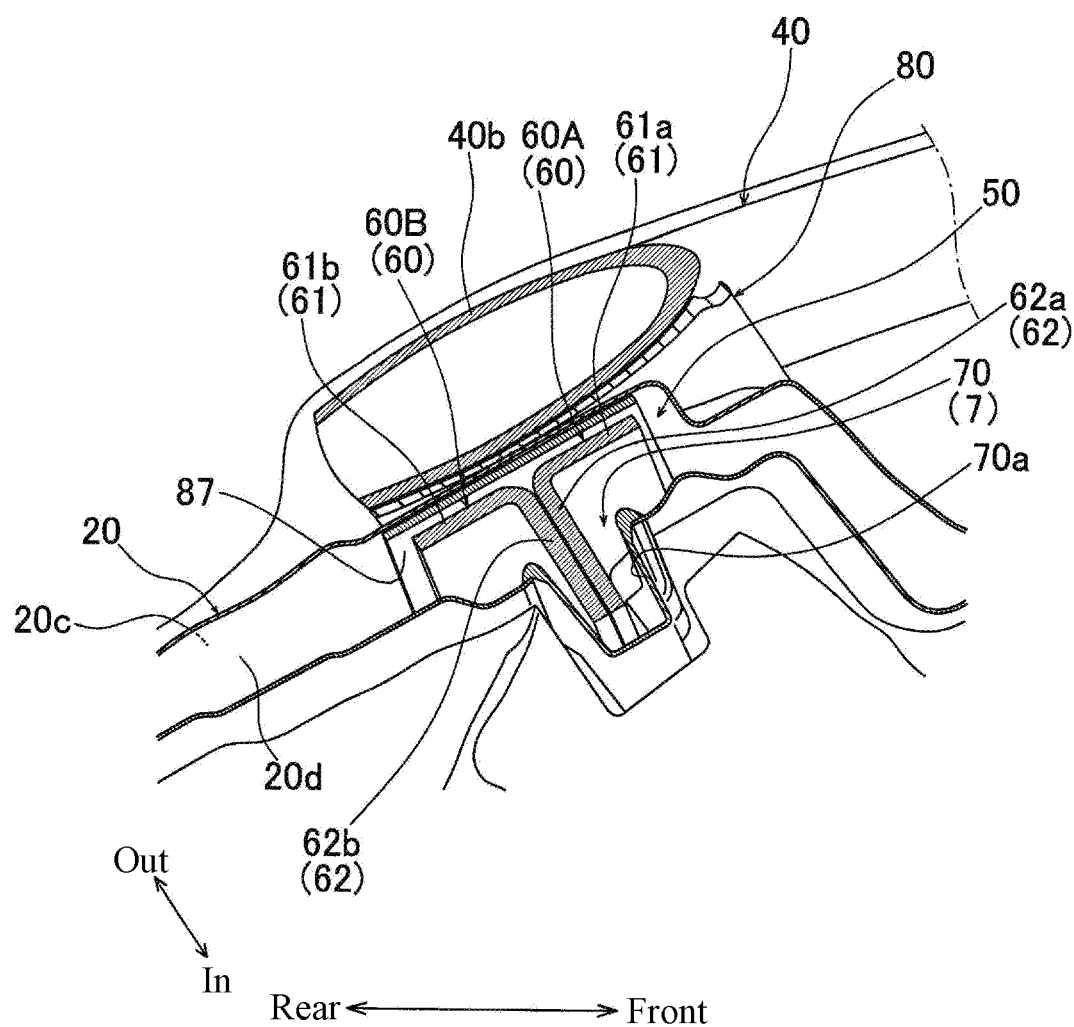
FIG. 5 is a view showing a cross section at a position corresponding to an A-A arrow in FIG. 3.

The vehicle body 10 of this embodiment includes a catcher mechanism 50 for connecting the front door 14A and a center pillar 17, which is a member on the vehicle body side, in a state in which the front door 14A is closed. FIG. 2 is a view of a rear lower end part of the front door 14A as viewed from the surface side, showing the rear end part 40b of the door beam 40 and its vicinity. FIG. 3 is a view of a rear lower end part of the front door 14A as viewed from the back side, showing an engaging hook 60 of the catcher mechanism 50. FIG. 4 is a view of a rear lower end part of the front door opening 16A, showing an insertion hole 70 of the catcher mechanism 50 provided on the vehicle body 10 side. FIG. 5 is a view showing a cross section at a position corresponding to an A-A arrow in FIG. 3. In addition to the cross section of the front door 14A, FIG. 5 also shows a cross section on the vehicle body 10 (center pillar 17 and front door opening 16A) side.

The catcher mechanism 50 is configured to include an engaging hook (engaging member) 60 connected to the rear end part 40b of the door beam 40, and an insertion hole 70 (engaged part 7) provided at the periphery the front door opening 16A in the vehicle body 10 (in the vicinity of a lower end part 17a of the center pillar 17). The insertion hole 70 is a hole into which the engaging hook 60 is inserted and engaged. Then, with the front door 14A being closed, the rear end part 40b of the door beam 40, and the engaging hook 60 and the insertion hole 70 of the catcher mechanism 50 are arranged at positions (approximately same positions in the front-rear direction and the up-down direction) overlapping with each other when viewed from the vehicle width direction.

As shown in FIG. 2, a bracket 80 is provided to attach the rear end part 40b of the door beam 40 to the inner panel 20. The rear end part 40b of the door beam 40 is fixed to a front surface (surface on the outer side in the vehicle width direction) 20c of the inner panel 20 via the bracket 80. The engaging hook 60 is fixed to the bracket 80. That is, the engaging hook 60 attached to a back surface (surface on the inner side in the vehicle width direction) 20d of the inner panel 20 is fixed to the bracket 80 by fastening bolts 85. That is, by fastening the bolts 85 penetrating the inner panel 20, the bracket 80 attached to the front surface 20c of the inner panel 20 and the engaging hook 60 attached to the back surface 20d are connected and fixed. A reinforcing member 87, which is a plate-shaped member made of metal, is interposed between the back surface 20d of the inner panel 20 and the engaging hook 60.

Further, as shown in FIG. 2, the bracket 80 is a member formed by bending a metal plate material, and includes a beam fixing part 81 fixing the rear end part 40b of the door beam 40, and a pair of extending parts 82 and 82 extending along a longitudinal direction L2 of the door beam 40 on the upper side (one side in a direction intersecting the longitudinal direction L2 of the door beam 40) and the lower side (another side in the direction intersecting the longitudinal direction L2 of the door beam 40) of the beam fixing part 81. The beam fixing part 81 is a portion formed by bending a plate material forming the bracket 80 into a curved surface along the outer surface (cylindrical surface) of the rear end part 40b of the door beam 40, and the rear end part 40b of the door beam 40 is clamped by the beam fixing part 81. The bolts 85 are inserted through and fixed to bolt holes (not shown) provided at the pair of extending parts 82 and 82 of the bracket 80. Accordingly, the engaging hook 60 is fixed (via the bolts 85) to the pair of extending parts 82 and 82 of the bracket 80.

The engaging hook 60 is composed of a first member 60A and a second member 60B which are formed by bending a plate-shaped member made of metal. The first member 60A is a plate-shaped member having a substantially L-shaped cross section including a first attachment part (attachment surface) 61a attached to the front door 14A (inner panel 20 and bracket 80), and a first projection part (insertion part) 62a extending from an end part of the first attachment part 61a toward the inner side (vehicle interior side) in the vehicle width direction. Further, the second member 60B is a plate-shaped member having a substantially L-shaped cross section including a second attachment part (attachment surface) 61b attached to the front door 14A (inner panel 20 and bracket 80), and a second projection part (insertion part)

62b extending from the second attachment part 61b toward the inner side (vehicle interior side) in the vehicle width direction.

The first projection part 62a of the first member 60A and the second projection part 62b of the second member 60B are overlapped with each other. As shown in FIG. 3, the first projection part 62a and the second projection part 62b are elongated portions with their longitudinal direction (the direction of arrow L1 in FIG. 3) extending in the up-down direction (specifically, an oblique up-down direction that slopes downward from the rear side toward the front side) which is a direction intersecting the longitudinal direction (the direction of arrow L2 in FIG. 3) of the door beam 40. Further, as shown in FIG. 5 and other figures, the first attachment part 61a of the first member 60A extends from a root portion of the first projection part 62a toward the front side of the vehicle body 10, the second attachment part 61b of the second member 60B extends from a root portion of the second projection part 62b toward the rear side of the vehicle body 10, and the first attachment part 61a and the second attachment part 61b extend in directions different from each other. That is, the first member 60A and the second member 60B of the engaging hook 60 are both plate-shaped members having a substantially L-shaped cross section, abut against each other back to back in opposite directions, and in this state, are attached to the back surface 20d of the inner panel 20 of the front door 14A.

Further, in the vicinity of the lower end part 17a of the center pillar 17 in the vehicle body 10 and in the vicinity of the lower part of the rear side of the front door opening 16A, the insertion hole 70 is formed as a bottomed recess that opens toward the outer side in the vehicle width direction and is recessed toward the inner side (vehicle interior side) in the vehicle width direction. With the front door 14A being closed, this insertion hole 70 is provided at a position overlapping with the projection part 62 (first projection part 62a and second projection part 62b) of the engaging hook 60 when viewed from the vehicle width direction, and is inserted into and engaged by the projection part 62 of the engaging hook 60 when closing the front door 14A. Further, as shown in FIG. 5, with the projection part 62 of the engaging hook 60 being inserted into the insertion hole 70, the surface (surface of the front side of the first projection part 62a) of the projection part 62 of the engaging hook 60 and an inner surface 70a of the front side of the insertion hole 70 are substantially parallel surfaces, and these surfaces are arranged opposite to each other.

As described above, the catcher structure of a door beam of this embodiment includes the front door 14A attached to the vehicle body 10 in an openable and closable manner, and the catcher mechanism 50 for connecting the front door 14A and the lower end part 17a of the center pillar 17, which is a member on the vehicle body side, in a state in which the front door 14A is closed. The front door 14A includes the inner panel 20 and the outer panel provided respectively on the inner side and the outer side in the vehicle width direction of the vehicle body 10, and the door beam 40 in an elongated shape which is arranged between the inner panel 20 and the outer panel in the vehicle width direction and extends in the front-rear direction of the vehicle body 10. The catcher mechanism 50 is composed of the engaging hook (engaging member) 60 connected to the rear end part 40b of the door beam 40, and the insertion hole 70 (engaged part 7) provided at the lower end part 17a of the center pillar 17 and engaging the engaging hook 60 (for the engaging hook 60 to insert into). In the state in which the front door 14A is closed, the rear end part 40b of the door beam 40, and the engaging hook 60 and the insertion hole 70 of the catcher mechanism 50 are arranged at positions overlapping with each other when viewed from the vehicle width direction.

Further, the engaging hook 60 of the catcher mechanism 50 includes the projection part 62 (first projection part 62a and second projection part 62b) which projects from the rear end part 40b of the door beam 40 toward the inner side in the vehicle width direction. The insertion hole 70 is a hole that opens toward the outer side in the vehicle width direction, and the projection part 62 is inserted into and engages with the insertion hole 70.

According to the catcher structure of this embodiment, when a load due to a collision (side collision) from the side of the vehicle is applied to the door beam 40, since the engaging hook 60 (projection part 62) is displaced in a direction of being pushed (inserted deeper) into the insertion hole 70 by the door beam 40 displaced toward the inner side (vehicle interior side) in the vehicle width direction due to the load, it is possible to reduce the possibility that the projection part 62 of the engaging hook 60 would slip out of the insertion hole 70. Accordingly, with a simple configuration, it is possible to effectively prevent disengagement of the catcher mechanism 50 in the event of a side collision of the vehicle. Therefore, since the tensile force in the longitudinal direction can be more reliably applied to the door beam 40, it is possible to effectively suppress the bending of the door beam 40 toward the inner side (vehicle interior side) in the vehicle width direction due to the load of a side collision.

Further, in the catcher structure of this embodiment, the projection part 62 of the engaging hook 60 is in an elongated shape with its longitudinal direction L1 extending in a direction intersecting the longitudinal direction L2 of the door beam 40.

According to this configuration, in the case where the central portion in the longitudinal direction of the door beam 40 is deformed by the load due to a side collision of the vehicle and is pushed further toward the vehicle interior side than the two end parts 40a and 40b, and thus the projection part 62 of the engaging hook 60 is displaced toward the center in the longitudinal direction of the door beam 40, with the surface (surface of the front side of the first projection part 62a) of the projection part 62 of the engaging hook 60 coming into planar contact (so-called plane-to-plane contact) with the inner surface 70a (see FIG. 5) of the insertion hole 70 on the door beam 40 side, it is possible to more effectively prevent the projection part 62 of the engaging hook 60 from slipping out of the insertion hole 70. That is, with the projection part 62 of the engaging hook 60 being in an elongated shape with its longitudinal direction L1 extending in a direction intersecting the longitudinal direction L2 of the door beam 40, since the surface of the projection part 62 is in planar contact with the inner surface 70a of the insertion hole 70, the contact resistance (frictional resistance) of the contact portion between the projection part 62 and the insertion hole 70 can be improved. Further, since it is possible to effectively disperse and receive the load applied to the contact portion between the projection part 62 and the insertion hole 70, disengagement of the catcher mechanism 50 can be more effectively prevented even with a large load.

Further, the catcher structure of this embodiment includes the bracket 80 which attaches the rear end part 40b of the door beam 40 to the inner panel 20, and the engaging hook 60 is fixed to the bracket 80.

According to this configuration, since the engaging hook 60 is fixed to the rear end part 40b of the door beam 40 via the bracket 80, relative displacement between the door beam 40 and the engaging hook 60 can be prevented. Therefore, since the tensile force in the longitudinal direction can be more reliably applied to the door beam 40, it is possible to more effectively prevent the central part in the longitudinal direction of the door beam 40 from displacing (deforming) toward the inner side (vehicle interior side) in the vehicle width direction.

Further, according to this configuration, by fixing the engaging hook 60 to the rear end part 40b of the door beam 40 via the bracket 80 formed of a plate-shaped member which is relatively easy to process, compared to the case where the engaging hook 60 is directly fixed to the rear end part 40b of the door beam 40, it is possible to facilitate the manufacturing process of the vehicle (vehicle body), improve the manufacturing efficiency, and reduce the costs.

Further, in the catcher structure of this embodiment, the bracket 80 includes the pair of extending parts 82 and 82 extending in the longitudinal direction L2 of the door beam 40 on the upper side and lower side (on two sides in a direction intersecting the longitudinal direction L2 of the door beam 40) of the rear end part 40b of the door beam 40, and the engaging hook 60 is fixed to the pair of extending parts 82 and 82 of the bracket 80.

According to this configuration, by fixing the engaging hook 60 to the extending parts 82 and 82 of the bracket 80 respectively provided on two sides (upper side and lower side) across the rear end part 40b of the door beam 40, it is possible to prevent the engaging hook 60 from moving in a direction falling to two sides (upper side and lower side) in a direction intersecting the longitudinal direction with respect to the door beam 40 in the event of a side collision of the vehicle.

Further, in the catcher structure of this embodiment, the engaging hook 60 is composed of the first member 60A and the second member 60B. The first member 60A is formed of a plate-shaped member having a substantially L-shaped cross section including the first attachment part (attachment surface) 61a attached to the front door 14A, and the first projection part (insertion part) 62a extending from the first attachment part 61a toward the inner side (vehicle interior side) in the vehicle width direction. The second member 60B is formed of a plate-shaped member having a substantially L-shaped cross section including the second attachment part (attachment surface) 61b attached to the front door 14A, and the second projection part (insertion part) 62b extending from the second attachment part 61b toward the inner side (vehicle interior side) in the vehicle width direction. The first projection part 62a of the first member 60A and the second projection part 62b of the second member 60B are overlapped with each other, and the first attachment part 61a of the first member 60A and the second attachment part 61b of the second member 60B extend in directions different from each other.

According to this configuration, since the first member 60A and the second member 60B which constitute the engaging hook 60 can be formed by bending, the productivity of the vehicle body is improved. Further, with the first projection part 62a and the second projection part 62b overlapping with each other and the first attachment part 61a and the second attachment part 61b extending in directions different from each other, since it is possible to prevent collapse of the first projection part 62a and the second projection part 62b (displacement of the first member 60A and the second member 60B in a direction in which the first projection part 62a and the second projection part 62b are inclined), disengagement of the projection part 62 of the engaging hook 60 and the insertion hole 70 can be more reliably prevented.

Although the embodiment of the disclosure has been described above, the disclosure is not limited to the above embodiment, and various modifications are possible within the scope of the technical ideas described in the claims, specification, and drawings. For example, in the above embodiment, although it has been shown that the catcher structure of the disclosure is applied to the front door 14A, the catcher structure of the disclosure may also be applied to the rear door 14B and other doors.

What is claimed is:

1. A catcher structure of a door beam, comprising:
   a door attached to a vehicle body in an openable and closable manner; and
   a catcher mechanism for connecting the door and a member on a vehicle body side in a state in which the door is closed, wherein
   the door comprises:
   an inner panel and an outer panel provided respectively on an inner side and an outer side in a vehicle width direction; and
   a door beam in an elongated shape which is arranged between the inner panel and the outer panel in the vehicle width direction and extends in a front-rear direction of the vehicle body,
   the catcher mechanism is composed of:
   an engaging member connected to an end part of the door beam; and
   an engaged part which is provided at the member on the vehicle body side and engages the engaging member,
   the catcher structure of a door beam further comprises a bracket which attaches the end part of the door beam to the inner panel,
   the engaging member attached to a back surface of the inner panel is fixed to the bracket attached to a front surface of the inner panel, and
   in the state in which the door is closed, the end part of the door beam, and the engaging member and the engaged part of the catcher mechanism are arranged at positions overlapping with each other when viewed from the vehicle width direction.

2. The catcher structure of a door beam according to claim 1, wherein
   the engaging member comprises a projection part projecting from the end part of the door beam toward the inner side in the vehicle width direction, and
   the engaged part has an insertion hole which opens toward the outer side in the vehicle width direction and into which the projection part is inserted.

3. The catcher structure of a door beam according to claim 2, wherein
   the projection part of the engaging member is in an elongated shape with its longitudinal direction extending in a direction intersecting a longitudinal direction of the door beam.

4. The catcher structure of a door beam according to claim 3, comprising:
   a bracket which attaches the end part of the door beam to the inner panel, wherein
   the engaging member is fixed to the bracket.

5. The catcher structure of a door beam according to claim 3, wherein
   the engaging member is composed of:
   a first member formed of a plate-shaped member having a substantially L-shaped cross section comprising a first attachment part attached to the door and a first projection part extending from the first attachment part toward the inner side in the vehicle width direction; and a second member formed of a plate-shaped member having a substantially L-shaped cross section comprising a second attachment part attached to the door and a second projection part extending from the second attachment part toward the inner side in the vehicle width direction, the first projection part of the first member and the second projection part of the second member are overlapped with each other, and the first attachment part of the first member and the second attachment part of the second member extend in directions different from each other.

6. The catcher structure of a door beam according to claim 2, comprising:

a bracket which attaches the end part of the door beam to the inner panel, wherein the engaging member is fixed to the bracket.

7. The catcher structure of a door beam according to claim 1, wherein the bracket comprises a pair of extending parts extending in a longitudinal direction of the door beam on two sides in a direction intersecting the longitudinal direction with respect to the end part of the door beam, and the engaging member is fixed to the pair of extending parts of the bracket.

8. The catcher structure of a door beam according to claim 7, wherein the engaging member is composed of:

a first member formed of a plate-shaped member having a substantially L-shaped cross section comprising a first attachment part attached to the door and a first projection part extending from the first attachment part toward the inner side in the vehicle width direction; and a second member formed of a plate-shaped member having a substantially L-shaped cross section comprising a second attachment part attached to the door and a second projection part extending from the second attachment part toward the inner side in the vehicle width direction, the first projection part of the first member and the second projection part of the second member are overlapped with each other, and the first attachment part of the first member and the second attachment part of the second member extend in directions different from each other.

9. The catcher structure of a door beam according to claim 1, wherein the engaging member is composed of:

a first member formed of a plate-shaped member having a substantially L-shaped cross section comprising a first attachment part attached to the door and a first projection part extending from the first attachment part toward the inner side in the vehicle width direction; and a second member formed of a plate-shaped member having a substantially L-shaped cross section comprising a second attachment part attached to the door and a second projection part extending from the second attachment part toward the inner side in the vehicle width direction, the first projection part of the first member and the second projection part of the second member are overlapped with each other, and the first attachment part of the first member and the second attachment part of the second member extend in directions different from each other.

* * * * *